L. G. HANMER.
AUTOMOBILE RADIATOR AND METHOD OF MAKING SAME.
APPLICATION FILED JAN. 31, 1918. RENEWED DEC. 16, 1919.

1,346,492.

Patented July 13, 1920.

INVENTOR:
Laurence G. Hanmer
BY
Chas. M. Chapman
ATTORNEYS.

L. G. HANMER.
AUTOMOBILE RADIATOR AND METHOD OF MAKING SAME.
APPLICATION FILED JAN. 31, 1918. RENEWED DEC. 16, 1919.
1,346,492.
Patented July 13, 1920.
3 SHEETS—SHEET 2.
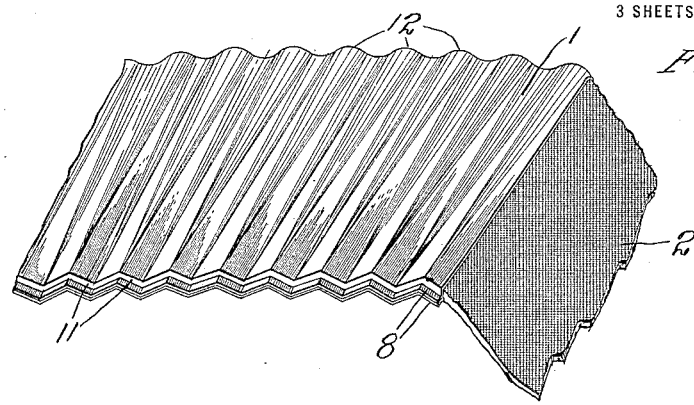
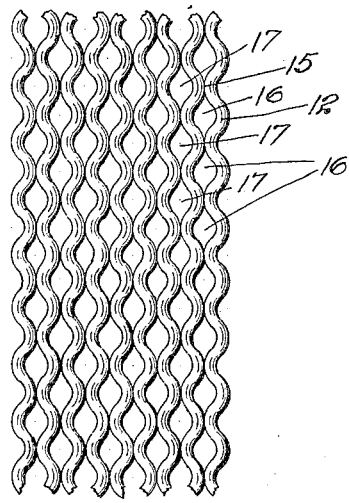
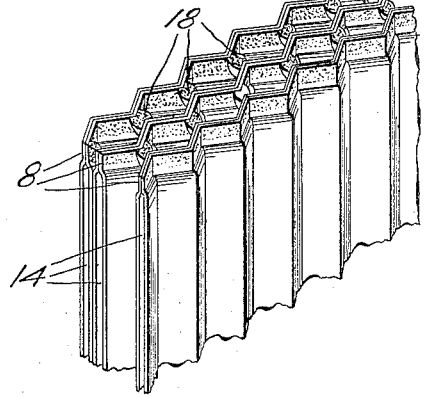

L. G. HANMER.
AUTOMOBILE RADIATOR AND METHOD OF MAKING SAME.
APPLICATION FILED JAN. 31, 1918. RENEWED DEC. 16, 1919.
1,346,492.
Patented July 13, 1920.
3 SHEETS—SHEET 3.
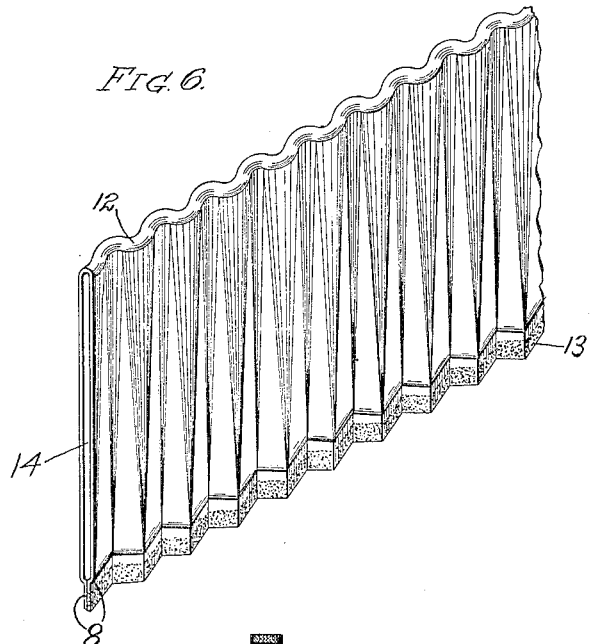
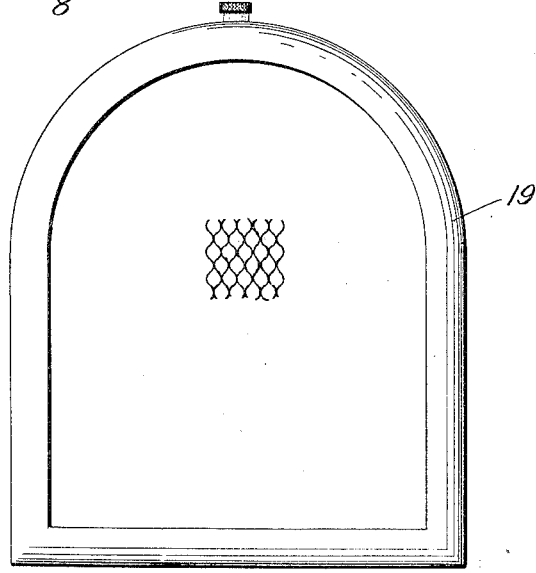

UNITED STATES PATENT OFFICE.

LAURENCE G. HANMER, OF BROOKLYN, NEW YORK, ASSIGNOR TO THE A-Z COMPANY, OF NEW YORK, N. Y., A CORPORATION OF NEW YORK.

AUTOMOBILE-RADIATOR AND METHOD OF MAKING SAME.

1,346,492. Specification of Letters Patent. Patented July 13, 1920.

Application filed January 31, 1918, Serial No. 214,738. Renewed December 16, 1919. Serial No. 345,302.

*To all whom it may concern:*

Be it known that I, LAURENCE G. HANMER, a citizen of the United States, residing in the borough of Brooklyn, county of Kings, and State of New York, have invented a new and useful Improvement in Automobile-Radiators and Methods for Making Same, of which the following is a description.

This invention relates to the art of condensers or radiators, and has particular reference to the method or process by which radiators, coolers or condensers of honeycomb structure, for hydrocarbon or internal combustion engines, are produced, and also to the article or product resulting from said process.

Heretofore, it has been proposed to make radiators, for the purposes stated, from a plurality of grouped tubes of various shapes in cross-section, and also to make radiators by grouping a plurality of sections made from a single piece of plaited material; but, in all instances, complicated machines have been employed and a great many hand operations have been required to produce the commercial article. Radiators thus made are not entirely satisfactory in that they look rough and crude, leak easily, and will not stand the wear and tear of hard usage on trucks and cars of various types. It has also been proposed to produce a tube-unit from a strip of plaited material, and to pile or stack said tube-units, bind them together, and solder them into a composite structure of predetermined shape or form. It has also been proposed to utilize a tube-unit of the general form just described in making V-shaped, angular, or convexed radiators or condensers for automobile purposes. The lost two methods have been found extraordinarily successful in many respects; but, like their predecessors, the faces of the radiators are more or less rough and do not answer to the highest and special demands of automobile manufacturers of the present day.

In view of the foregoing, it is an object of my invention to produce a novel unit-structure, by a few simple and effective steps, capable of being grouped in a novel way to produce a radiator or condenser for high-class motor cars, and especially cars of high power, and also to provide an economical, efficient and cheap method for the production of radiators or coolers for all purposes. Other objects may be noted as follows: To provide a method for making automobile radiators of special form and type, as hereinafter explained, which will be expeditious, economical and effective; to produce a cooler or radiator for hydrocarbon engines, the face or exposed surface of which may be curved in one or more angular directions or may be of irregular form; to produce an automobile radiator in accordance with an expeditious, simple and economical method, the face of which may be highly polished and devoid of solder; to product an automobile radiator of any desired form from a plurality of tube-units having a folded or seamless edge, constituting a part of the face of the radiator and which is devoid of any facial solder or means for separating the units or holding the units rigidly together; to provide a tube-unit, or radiator-unit, and a novel method for making the same, the unit being adapted to be incorporated in an automobile cooler of any desired form and susceptible, individually or collectively, of receiving a high facial polish; to provide a strip-unit and method for making the same, adapted to be converted into a tube-unit to be ultimately embodied in automobile radiators of various forms and which require only approximately 50% of the solder heretofore employed in such structures; and to provide a strip-unit convertible into a tube-unit, or radiator-unit, for automobile radiators or other purposes, having certain novel characteristics adapting it for coolers, condensers or radiators of practically any form; and to provide a novel method for producing the radiator-unit or tube-unit, stated in the foregoing, which shall be effective, economical and practical.

With the above objects in view and others which will be detailed during the course of this description, my invention consists in the article, the method for making the same, and in certain elements, features and combinations thereof hereinafter described and claimed.

In order that my invention may be clearly understood, I have provided drawings wherein:

Fig. 3 is a perspective view of a section of the product as it passes from the press of Fig. 2;

Fig. 4 is a front elevation of a group of tube-units;

Fig. 5 is a perspective view of a group of tube-units showing the soldered edges thereof, the view being broken off to save space;

Fig. 6 is a perspective view of a tube-unit showing particularly the soldered back-edge and folded front-edge thereof; and Fig. 7 is a front elevation illustrating one form of radiator in which the tube-units of Fig. 6 may be grouped, the grouping being in accordance with Fig. 4.

Figure 1:
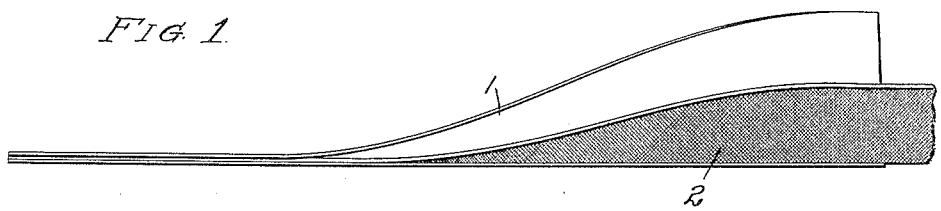
Figure 1 is an elevation of a plain, folded strip of sheet metal with the separating material inserted therein, one end of the folded strip being spread open for clarity.

Primarily, I construct a strip-unit, that is, during a certain step of the process, produce a folded strip of material which is subsequently developed into a strip-unit. The strip-unit is subsequently treated to produce a radiator, or tube-unit, having certain important structural characteristics, viz., a seamless, unbroken, bend or edge surface which I will designate the face-edge, because it becomes part of the face of the radiator when the tube-units are grouped to produce a radiator, cooler or condenser. In producing the strip-unit, a fold is made longitudinally of the strip of flexible metal so as to make the same double-thick with one edge or face seamless, continuous and without break, and to make the other edge or back double-thick and open. This gives another characteristic feature to the tube-unit or radiator-unit, viz., corrugations in the two thicknesses of material which are produced simultaneously and are, therefore, uniform in all directions in the two thicknesses of material. Another characteristic feature of the tube-unit or radiator-unit is that, according to the form of radiator desired, the doubled or face-edge of the tube-unit may have corrugations in the form of symmetrical, curved, connecting flutes, while the back-edge of the radiator, both thicknesses, may have corrugations which are more or less angular as compared with the face-edge corrugations. And the means for producing the corrugations in the double thick strip-unit may be of such form that the angular corrugations, at the back-edge, are produced simultaneously with the formation of the curved corrugations at the face-edge, while the corrugations between the two edges will gradually diminish in angularity from the back-edge to the face-edge. Or the corrugations in the strip-unit may be quite angular, or may be curves without angles, from back-edge to face-edge. The formation of the strip-unit is dependent entirely upon the character of radiator ultimately to be produced. Another characteristic of the tube-unit is that the face-edge thereof is in no wise added to, as by solder; but, is susceptible of a high degree of polish and especially when made of brass, copper and other materials usually employed for the purpose, while the back-edge is closed by soldering together the two thicknesses of material along their corrugations, thus completely closing the back-edge and producing a tube-unit. Another characteristic of my tube-unit is that the water space between the two thicknesses extends clear to the face-edge and also practically to the back-edge, limited only, in the latter instance, by the extent to which the inner faces of the two thicknesses are offset and engaged for closing the back-edge of the tube-unit. The tube-unit may be added to by applying a frame and by adding such other fixtures as may be necessary to make thereof a radiator-unit, capable of being superficially cooled by the application of air and of conducting liquid, hot or cold, from end-to-end through the water-space, which liquid will travel the corrugations of the tube-unit or radiator-unit from end-to-end and edge-to-edge. Prior to soldering the back-edge of the tube-unit, it may have its face-edge formed in any manner desired, that is, convexed or concaved, or different parts thereof given different curvatures, considering the length of the tube-unit. The face-edge of the tube-unit may be convexed during the process of corrugating the same by making the crimps or corrugations at the back-edge sharper than the crimps or corrugations at the face-edge. This may be done by corrugating rolls of special form. The reverse of this may be accomplished, viz., the face-edge of the radiator may be concaved and the back-edge convexed by making the corrugations at the face-edge sharper than the corrugations at the back-edge. Or the strip-unit may be corrugated uniformly from edge-to-edge and subsequently placed in a form or holder of predetermined shape and a templet or forming-bar inserted between the two thicknesses of the strip-unit in order to give the proper conformation.

Having produced the tube-unit with the characteristics above noted, they are grouped or piled together with the convexities of their corrugations impinging or engaged and their concavities opposite, throughout the length of the tube-units. When thus piled or grouped, they are securely clamped together to prevent them from having relative movement, acid is applied to the back-edges of the grouped units, and said back-edges are subsequently dipped in solder which is allowed to solidify. A radiator-frame of predetermined shape will then be applied and the radiator finished in the usual way. Subsequently, the entire face of the radiator can be buffed or polished, the folded or doubled edges of the tube-units taking a high polish and glistening like molten metal.

Among the important characteristics of a radiator thus produced are: that it may be subjected to excessive vibrations, jolts, jars and blows without causing the face of the radiator to leak; it may expand and contract indefinitely from variations and changes in temperature without bursting, and if the fluid therein should freeze, the tube-units will not burst because they are capable of properly expanding to avoid the same; the tube-units being connected together only at their back-edges are free to vibrate, individually and independently, and are thus capable of absorbing, without injury or injurious effect, excessive vibration to which the vehicle or radiator-frame may be subjected; and the metal is not subject to granulation as the result of vibration or agitation while in use and is not, in consequence, liable to fracture or leak from any other cause common to radiators as heretofore constructed.

The method by which the tube-unit is produced may be described specifically as follows: The strip of material 1 of proper width for a tube-unit may be wound in rolls and the latter journaled in convenient position so that the strip, in passing from the roll, may be folded longitudinally. Or the strip of material may be produced in definite lengths and, primarily, folded longitudinally, instead of as a step successive to its feed from the journaled roll. The longitudinally folded strip, as shown in Fig. 1, next has placed therein a piece of soft, but comparatively heavy, fabric 2 so that, during the corrugating process, the two thicknesses of material will not adhere or become so compressed as to give sharp bends at the folded face-edge or too sharp bends at the separated back-edge. The object of this is also to make, throughout the length of the tube-unit, a uniform fluid passage between the two thicknesses of corrugated material. It is pointed out that this step of my process produces the corrugation in any form desired in a double-thick or folded strip of flexible material, in contradistinction to corrugating a single thick strip of material. I have suggested a piece of comparatively heavy, soft fabric as a separating medium between the two thicknesses of the strip-unit, because the latter can be readily extracted in various ways at the proper time. I do not wish to be limited to the use of such material, however, as other soft materials such as soft metal, capable of being rendered limpid and thus caused to flow from between the two thicknesses of material, may be employed. Or a tenacious soft paper can be employed to maintain the separation of the two thicknesses of material during the corrugating process. If soft metal, such as lead, be employed, it will be melted out at the proper time, and this can be done by subjecting the corrugated material to heat either before or after it is cut into the proper lengths for tube-units. If fabric or paper or similar material is employed, the same will be withdrawn from the strip-unit before the same is cut into lengths for the tube-units.

Figure 2:
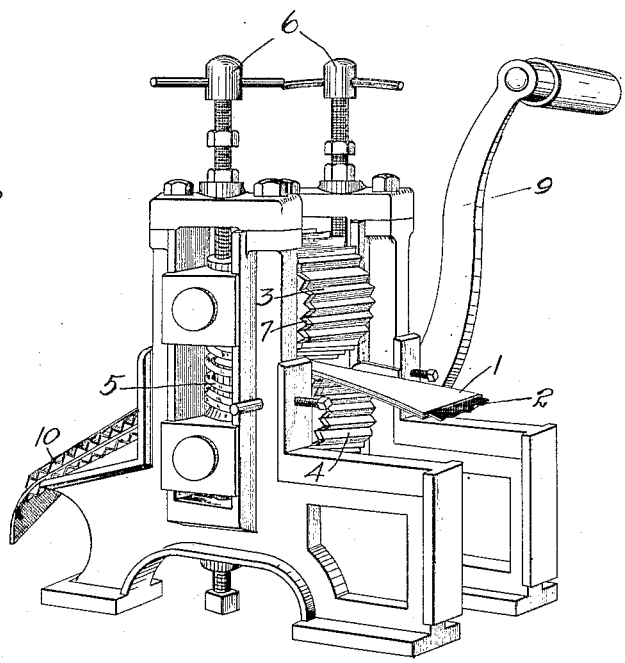
Fig. 2 is a perspective view of a corrugating press which I have found suitable for my purposes.

The corrugations may be produced in any suitable hand press or power press, such as shown, by way of example, in Fig. 2. This press is provided with corrugating rolls 3 and 4, which are held yieldingly in coöperative relation in any suitable manner, as by interposing between the journal-boxes of the rolls a sufficiently strong pair of springs 5. The upper journal-boxes may be raised and lowered by hand manipulatable screws 6, so as to get the proper regulated distance between the corrugating rollers for the particular work in hand. As shown, the rollers 3 and 4 are corrugated in such manner as to produce the desired effect upon the double-thick metal strip with interposed, soft material. One end of each of the rollers is provided, at the end of the corrugations with a slight enlargement 7 for the purpose of compressing the free edges of the metal strip toward each other to produce the flanges or offsets 8 beyond the edge of the material 2, see Figs. 2 and 3. The folded material 1, with inserted strip 2, is passed through the rollers, Fig. 2, by manipulating the hand crank 9, and emerges on the other side completely corrugated, as at 10, such corrugations having the form, as heretofore explained, according to the form of radiator desired. In Fig. 3 I have shown the strip-unit with material 2 therein provided with comparatively sharp or angular corrugations at the back-edge, as at 11, gradually diminishing to curved flutes or corrugations 12, at the face-edge; and the latter, by reason of the form of the rollers producing such corrugations, is rendered convexed or curved from end to end on a larger radius than is the back-edge or open edge of the strip-unit. The soft material 2 is then removed from the strip-unit, as heretofore suggested, and said strip-unit is now ready to be formed into a radiator-unit or tube-unit, as the case may be.

The tube-unit is produced by placing the strip-unit in a suitable holder, or form of predetermined shape, according to the results desired, and said strip-unit is thus given the shape desired for the tube-unit. The offset or flanged edges 8 of the strip-unit are then pressed into contact and solder 13 applied for the purpose of holding said flanges closely together and entirely sealing the back-edge of the unit. This produces a tube-unit such as shown in Fig. 6, having a water passage 14 from end to end thereof and extending from the soldered back-edge 8 to the doubled or folded face-edge 12. The tube-units thus produced are then grouped substantially as shown in Figs. 4 and 5 with the convexities of their corrugations in contact, as at 15, thus producing the air passages 16 between each two sets of tube-units. By placing the tube-units together in pairs with their convexed portions in contact, as at 15, the next adjacent tube-unit similarly arranged will provide air passages 17 opposite the engaged or contiguous surfaces 15. The folded edges 12, as clearly shown in Fig. 4, are devoid of soldering, or other media of connection, and are held merely in contact by the mode of grouping the several tube-units and by soldering the flanged back-edges 8 together, this being clearly shown in Fig. 5, wherein the back-edges of the grouped tube-units are shown as covered with solder 18.

The tube-units, when thus grouped and soldered together, which may be accomplished by clamping the units in a suitable clamping frame and then first dipping the flanged edges 8 in acid and subsequently in molten solder, are placed in a frame 19, Fig. 7, which may be of any suitable or predetermined form and which latter is provided with the usual tanks, connections, etc.

Having thus described my invention, what I claim and desire to secure by Letters Patent is:

1. The method for making strip-units for radiators, consisting in folding a strip of flexible sheet material longitudinally so as to produce two thicknesses of material joined by a single rounded bend at one edge and with the opposite edges separated and devoid of bends, and then corrugating said double-thick material so that the corrugations will conform to each other both longitudinally and transversely of the strip-unit.

2. The method for making strip-units for radiators consisting in folding a strip of flexible sheet material so as to produce two thicknesses joined by a single rounded bend, inserting between the thicknesses of material a soft, pliable medium, and then forming a series of corrugations in the strip thus prepared.

3. The method for making strip-units for radiators consisting in folding a strip of flexible sheet material so as to produce a plurality of thicknesses, inserting between the thicknesses of material a compressible medium, and forming a series of corrugations in the folded strip thus prepared.

4. The method for making strip-units for radiators consisting in folding a strip of flexible sheet material longitudinally so as to produce a plurality of thicknesses, and then forming in the folded strip a series of transverse corrugations extending to the fold of the strip and the walls of which corrugations have different conformations at their opposite ends.

5. The process for producing radiator or tube-units consisting in folding a strip of flexible sheet material longitudinally so as to produce a plurality of thicknesses joined by a single rounded bend, corrugating said folded strip so that the corrugations will conform to each other both longitudinally and transversely of the strip-unit and at the same time offsetting the material at the open edge of the folded strip, and then soldering the separated edges at their offsets so as to close the open edge of the strip and form a water space extending from end to end of the unit.

6. The method for making radiators consisting in producing a strip-unit having as essential characteristics a plurality of ribs, plaits or corrugations extending in parallelism transversely of the strip, and a folded longitudinal edge, and having a plurality of offsets at the marginal edges of the material opposite the folded edge; then soldering the edges of the plaited or corrugated strip adjacent the offsets, so as to form a tube; then grouping a plurality of tubes one upon or against the other with the offsets of the tubes in engagement at their angles at separated points along the length of the tubes; then soldering the grouped tubes so as to cause them to adhere solidly to each other at the back-edges of the tubes or at the soldered ends of the corrugations and leave their front edges, or the folded ends of the corrugations, free and without connecting media; then applying the radiator frame structure in the usual manner.

7. A strip-unit for automobile radiators consisting of a piece of double-thick, flexible sheet material having a folded or seamless longitudinal edge and an open edge, and having a plurality of plaits, ribs or corrugations extending transversely thereof in parallelism from the folded edge to the open edge of the double-thick strip, said thicknesses of the strip having at the open edge of the latter offsets or bulged portions extending from end to end of the strip.

8. A radiator or tube-unit consisting of a strip of double-thick, flexible sheet material of predetermined length, said strip having a non-angular fold along one of its edges so as to be devoid of seams or joints, and said strip being also provided in both of its thicknesses with a plurality of transversely extending plaits of corrugations which register with and conform to each other, and said strip having its open edge permanently secured by solder, thus producing a passage for fluid from end to end of the strip.

9. A radiator or tube-unit comprising a strip of flexible material folded substantially midway longitudinally so as to be seamless and without opening along its folded edge, and having its free longitudinal edges provided with a plurality of offsets adapted to engage each other and hold the thicknesses of material apart, said offset edges being connected by solder, the folded strip being provided in both of its thicknesses with corresponding corrugations extending parallel with each other in two planes substantially at right-angles to each other.

10. A radiator or tube-unit comprising a strip of flexible material folded substantially midway longitudinally so as to provide a seamless edge, and having its free longitudinal edges joined so as to form the strip into a tube from end to end, said strip being formed with plaits or corrugations having a greater degree of angularity at one edge of the strip than at the other.

11. A radiator or tube-unit comprising a strip of flexible material folded substantially midway longitudinally so as to produce a seamless, unbroken edge, and having its free longitudinal edges joined or seamed, said folded strip being corrugated transversely so as to give to one edge of the strip the curvature of the arc of a circle of greater radius than that of the other edge.

12. The method for making strip-units for radiators consisting in folding a strip of flexible sheet material so as to produce a plurality of thicknesses; inserting between the thicknesses of material a compressible medium; forming in the folded strip a series of corrugations; and removing the compressible material from between the thicknesses.

LAURENCE G. HANMER.